(12) United States Patent
Faure (10) Patent No.: US 11,681,836 B2
(45) Date of Patent: Jun. 20, 2023

(54) COMPUTER-IMPLEMENTED METHOD FOR COMPUTING AN ENVELOPE FOR A BUILDING COMPLYING WITH SHADOW DURATION REQUIREMENTS

(71) Applicant: Dassault Systemes, Velizy Villacoublay (FR)

(72) Inventor: Bertrand Faure, Meudon la Foret (FR)

(73) Assignee: Dassault Systemes, Velizy Villacoublay (FR)

( * ) Notice: Subject to any disclaimer, the term of this patent is extended or adjusted under 35 U.S.C. 154(b) by 1285 days.

(21) Appl. No.: 16/050,484

(22) Filed: Jul. 31, 2018

(65) Prior Publication Data
US 2019/0065632 A1 Feb. 28, 2019

(30) Foreign Application Priority Data

Aug. 30, 2017 (EP) .................................... 17306114

(51) Int. Cl.
*G06F 30/13* (2020.01)
*G06T 15/60* (2006.01)
*G06T 7/564* (2017.01)
*G06F 30/20* (2020.01)
*G06F 111/04* (2020.01)

(52) U.S. Cl.
CPC .............. *G06F 30/13* (2020.01); *G06F 30/20* (2020.01); *G06T 7/564* (2017.01); *G06T 15/60* (2013.01); *G06F 2111/04* (2020.01)

(58) Field of Classification Search
CPC .......... G06F 30/00; G06F 30/13; G06F 30/20; G06F 2111/04; G06T 15/60; G06T 7/564

USPC ............................................................ 703/1
See application file for complete search history.

(56) References Cited

U.S. PATENT DOCUMENTS 9,600,927 B1    3/2017   Poursohi et al.

FOREIGN PATENT DOCUMENTS

WO        2007127864 A2    11/2007

OTHER PUBLICATIONS

Breen, John et al. "Designing a Bioshelter in Worcester", May 5, 2015, WPI. (Year: 2015).*
Pongpattana, Chanadda et al., "Efficient Algorithm and Computing Tool for Shading Calculation", Aug. 12, 2005. (Year: 2005).*

(Continued)

*Primary Examiner* — Cedric Johnson
(74) *Attorney, Agent, or Firm* — Hamilton, Brook, Smith & Reynolds, P.C.

(57) ABSTRACT

A computer-implemented method for computing an envelope (BE) for a building to be designed, the method comprising: defining an initial volume (IV) of the building; and for each one a plurality of points (P1, P2, P3) of a boundary (PRB) of a neighboring region (PR) of the building, computing a cutting surface (CS) and modifying the initial volume by cutting out portions thereof extending above said cutting surface; wherein each cutting surface is defined in such a way that the initial volume, modified by cutting out portions thereof extending above it, projects over the corresponding point of the boundary a shadow (SW) whose duration is equal to a predetermined value; said envelope being defined by a boundary surface of a remaining volume. A computer program product, a non-transitory computer-readable data-storage medium and a Computer Aided Design system for carrying out such a method.

20 Claims, 7 Drawing Sheets

(56) References Cited

OTHER PUBLICATIONS

Capeluto, Guedi, "Energy Performance of the Self-Shading Building Envelope", Jul. 12, 2002, Energy and Buildings 35, Elsevier Science B.V. (Year: 2003).*

Foroushani, Seyed Sepehr Mohaddes et al., "Effects of Roof Overhangs on Wind-Driven Rain Wetting of a Low-Rise Cubic Building: A Numerical Study", Dec. 27, 2013, J. Wind Eng. Ind. Aerodyn. 125, Elsevier, Ltd. (Year: 2013).*

Wright, Robert et al., "Computational Issues in Urban Design: Developing a Strategy for Solar Impact Assessment", 1993, CAAD Futures '93, Elsevier Science Publishers B.V. (Year: 1993).*

European Search Report for EP Application No. 17306114.4, entitled "Computer-Implemented Method for Computing an Envelope for a Building Complying With Shadow Duration Requirements," consisting of 14 pages, dated Feb. 15, 2018.

Epcotads: "ADS-BT for Revit2018.2017 Ver? Overview," youtube, Jul. 31, 2017 (Jul. 31, 2017), 11 pages, XP054978084, Retrieved from the Internet: URL:https://www.youtube.com/watch?v=CocjwQbhqAs [retrieved on Feb. 7, 2018].

* cited by examiner

COMPUTER-IMPLEMENTED METHOD FOR COMPUTING AN ENVELOPE FOR A BUILDING COMPLYING WITH SHADOW DURATION REQUIREMENTS

RELATED APPLICATION(S)

This application claims priority under 35 U.S.C. § 119 or 365 to Europe, Application No. 17306114.4, filed Aug. 30, 2017. The entire teachings of the above application(s) are incorporated herein by reference.

FIELD OF INVENTION

The invention relates to a computer-implemented method for computing an envelope for a building complying with a maximum shadow duration requirement over a neighboring region.

The invention applies to the field of Computer Aided Design (CAD), and more specifically to that of Computer Aided Architectural Design (CAAD).

BACKGROUND

Buildings, especially tall or massive ones, unavoidably cast shadows over surrounding areas. This may constitute a nuisance, and is often regulated. In some countries such as Japan, in particular, the duration of the shadow cast over some zones (public gardens, schools . . . ) may not exceed certain predetermined durations. This constitutes a constraint with which architects must comply.

Trial-and-error, rules of thumb and experience may assist architects in designing buildings complying with maximum shadow duration requirements, but these approaches are inefficient. In particular, they cannot ensure that the useful floor surface of the resulting building is maximized. This latter consideration is very important in densely-populated areas where land prices are high, e.g. in large cities like Tokyo.

"A&A Shadow" is a software tool by Vectorworks Inc. allowing determining a "building envelope" having maximal volume while complying with maximum shadow duration requirements over a predetermined region. The computation algorithm is not disclosed; however, it is supposed that this tool performs a random variational optimization of the envelope volume under constraints defined by the maximum shadow duration requirements. Being based on a variational approach this method is not efficient, leading to long calculation times, and is prone to be trapped in "local maxima", and therefore to the risk of providing sub-optimal solutions. Moreover, the architect has little or no control over the result which is achieved.

SUMMARY

The invention aims at overcoming these drawbacks. More particularly, it aims at providing a fast and reliable method for computing a maximum volume envelope complying with a maximum shadow duration requirement.

According to the invention, this aim is achieved by a geometric approach wherein an initial volume is progressively "trimmed" by intersecting it with a plurality of "cutting surfaces", each one ensuring a predetermined shadow duration at a respective point of the boundary of a neighboring region. This method is based on simple geometric calculations, which can be performed efficiently. It is completely deterministic, which ensures its reliability. Moreover, as it will be explained below, it allows the architect to choose the position of the top of the building, thus providing more flexibility than the prior art.

An object of the present invention is then a computer-implemented method for computing an envelope for a building to be designed, the method comprising: defining an initial volume of the building; and for each one a plurality of points of a boundary of a neighboring region of the building, computing a cutting surface and modifying the initial volume by cutting out portions thereof extending above said cutting surface; wherein each cutting surface is defined in such a way that the initial volume, modified by cutting out portions thereof extending above it, projects over the corresponding point of the boundary a shadow whose duration is equal to a predetermined value; said envelope being defined by a boundary surface of a remaining volume.

More particularly, the method may comprise the steps of:
a) receiving as inputs:
a latitude of the building,
a ground contour of the building,
a boundary of a neighboring region of the building, and
a maximum allowed duration of shadow of the neighboring region from the building;
b) computing an initial volume by vertically extruding the ground contour of the building;
c) for each one of a plurality of points of a portion of the boundary of the neighboring region facing the ground contour of the building, computing a cutting surface defined by:
two vertical planes forming a dihedral angle having a vertical edge passing through said point, the planes being symmetrically disposed on either side of a predetermined ground point constituting a projection on ground of a highest point of the building; and
a conical surface, having the point as its vertex and a sun path at the latitude of the building on a predetermined date as its base, said conical surface being interrupted by a gap formed by said dihedral angle;
the dihedral angle having an amplitude such that the sun travels through the gap in a time equal to said maximum allowed duration of shadow;
and cutting out portions of the initial volume extending above said cutting surface; and
d) determining a boundary surface of a volume remaining after said cutting out, said boundary surface constituting an envelope of the building to be designed.

According to particular embodiments of the method:
Said predetermined date is may be winter solstice. Alternatively, step a) may further comprise receiving as an input said predetermined date.

Step a) may further comprise receiving as an input a position of said predetermined point, constituting a projection of the ground of a highest point of the building.

Steps b) to d) may be iterated a plurality of times for different positions of said predetermined point constituting a projection of the ground of a highest point of the building, yielding a corresponding plurality of envelopes of the building to be designed, the method further comprising a step of choosing the envelope defining a largest volume.

The method may further comprise a step e) of smoothing out said surface constituting an envelope of the building to be designed.

Said boundary of the neighboring region may be a contour line delimitating a planar representation of the neighboring region.

Another object of the invention is a computer program product, stored on a non-volatile computer-readable data-storage medium, comprising computer-executable instructions to cause a computer system to carry out such a method.

Another object of the invention is a non-transitory computer-readable data-storage medium containing computer-executable instructions to cause a computer system to carry out such a method.

Another object of the invention is a computer system comprising a processor coupled to a memory and a graphical user interface, the memory storing computer-executable instructions to cause the computer system to carry out such a method.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Additional features and advantages of the present invention will become apparent from the subsequent description, taken in conjunction with the accompanying drawings, wherein
FIGS. 5 to 7C illustrate a method according to an embodiment of the invention.

DETAILED DESCRIPTION

A description of example embodiments follows.

Figure 1A:
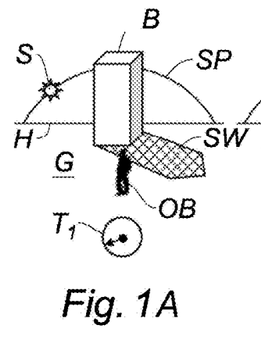
FIGS. 1A-1D illustrate the concept of shadow duration.
Figure 1B:
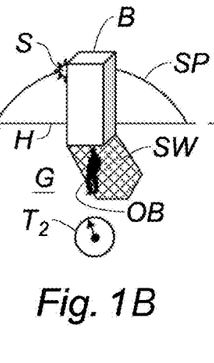
Figures 1C, 1D:
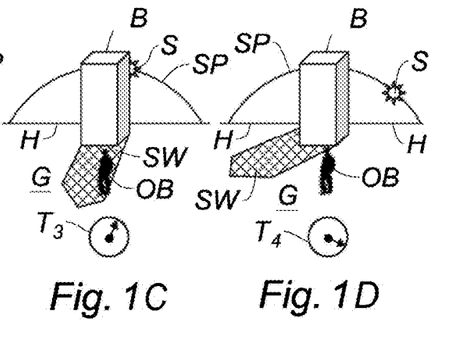

FIGS. 1A-1D illustrate what is meant by "shadow duration". On the figure, arc SP represents the path of the sun S above the horizon H, during a particular day of the year and at the latitude at which a (prospective or existing) building B is situated. Building B projects a shadow SW on the ground G, the orientation, shape and size of which vary as the sun travels along its path. At time $T_1$, early in the morning (FIG. 1A), observer OB is not in the shadow of the building. As time passes, the sun travels from east to west (clockwise) along its path, and the shadow turns from west to east (also clockwise); at time $T_2$ (FIG. 1B) the shadow reaches the observer. The shadow continues turning, and after time $T_3$ the observer is no longer shadowed (FIG. 1C). FIGS. 1D represents the situation at time $T_4$, in the evening. The duration of shadow for the observer OB is then given by $T_3$-$T_2$.

Figure 2:
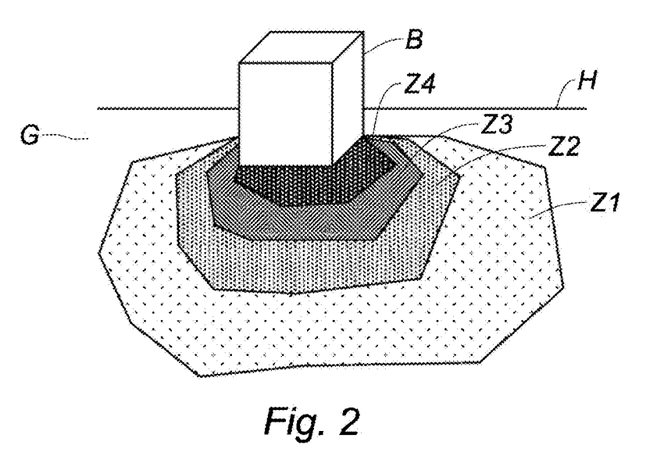
FIG. 2 shows a shadow duration map.

A duration of shadow can be easily computed for a plurality of points sampling a region of the ground in the vicinity of the building B. This leads to a shadow duration map, such as the one illustrated on FIG. 2 where Z1, Z2, Z3, and Z4 are zones characterized by different shadow duration ranges. For instance, inside zone Z4 the shadow duration exceeds 4 hours; in zone Z3 it is comprised between 3 and 4 hours; in zone Z2, between 2 and 3 hours, in zone Z1 between 1 hour and 2 hours and outside zone Z1 it is less than one hour. Strictly speaking, a shadow duration map is only valid for a specific date. Most often this date is the winter solstice (around December $21^{st}$ in the northern hemisphere and June $21^{st}$ in the southern hemisphere), which corresponds to the longest shadow duration.

Figure 3:
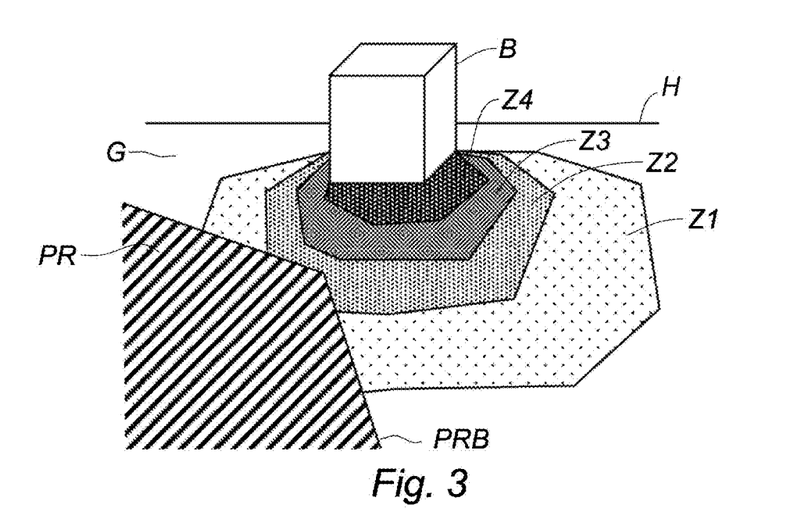
FIG. 3 represents, on the shadow duration map of FIG. 2, a region wherein a maximum allowed duration of shadow is defined.

As discussed above, local regulation may define "protected" regions or zones in which the shadow duration shall not exceed a preset limit. FIG. 3 represents such a region PR, delimitated by a boundary PRB, superimposed on the shadow duration map of FIG. 3. It is assumed that the maximum allowed shadow duration inside region PR is 1 hour. It can be seen that the "protected" region extends inside zones Z1 and Z2 of the shadow duration map. This means that the shadow duration constraint is not satisfied, and building B does not comply with the regulation. It is then necessary to modify the shape or the size of the building so as to ensure that the shadow duration remains below the one-hour limit inside the protected region.

Figure 4:
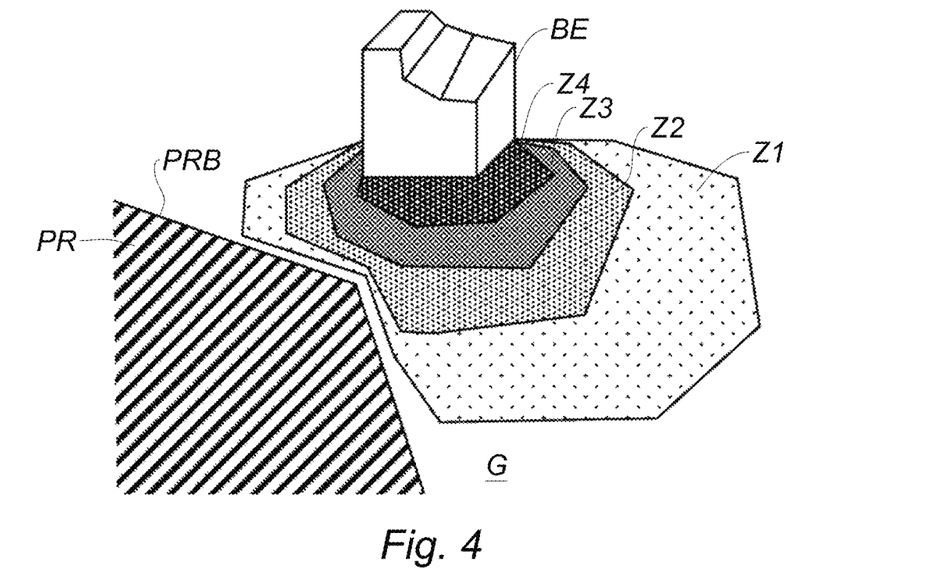
FIG. 4 shows a building envelope designed to comply with said maximum allowed duration of shadow.
Figure 5:
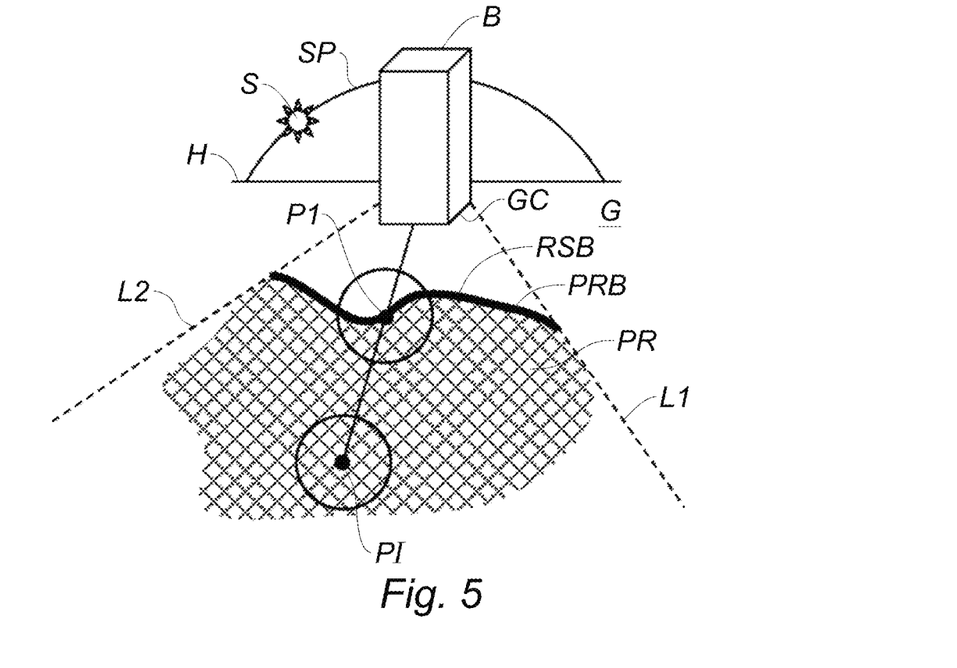
Figure 6:
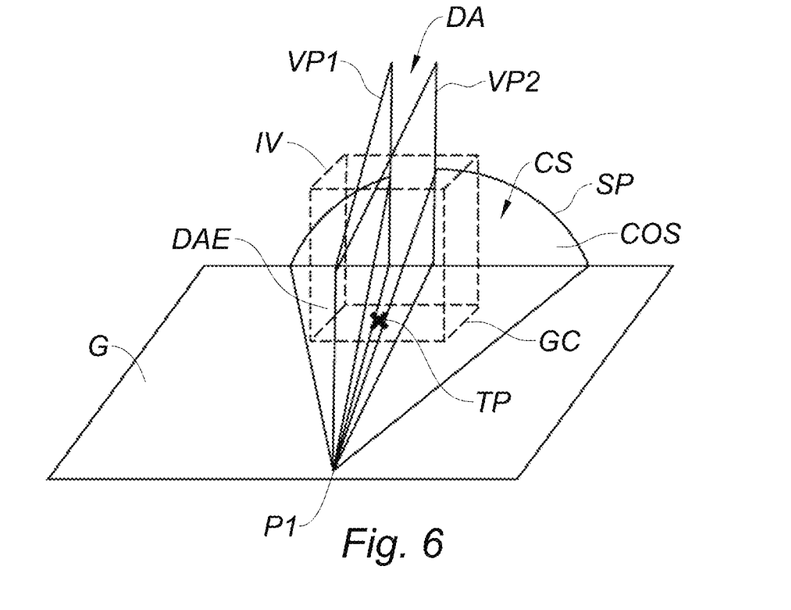

FIG. 4 shows a "building envelope" BE which satisfies this constraint. The term "building envelope" underlines the fact that the actual building may take any different shape, provided that it remains entirely inside the "envelope". It can be seen that the shadow duration map for BE is different from that of building B (FIGS. 2 and 3): regions Z1 and Z2 take different shapes, excluding the protected region PR. Although they are represented as distinct for the sake of clarity, the boundaries of region Z1 and of the protected region (PRB) ideally coincide, to ensure that the shadow duration constraint is strictly complied with.

The inventive method to compute an optimal shape of the building envelope BE will then be described with reference to FIGS. 5 to 7C.

A key element of the invention is that it is sufficient to ensure that the maximum shadow duration constraint is verified on a relevant segment RSB of the boundary PRB of the protected region. As illustrated on FIG. 5, this segment RSB is a portion of the boundary facing the zone where the building will be situated, comprised between two straight lines L1 and L2. L1 is the line passing through the most westerly point of the ground contour GC of the future building, and whose orientation corresponds to the azimuth of the sun at dawn—or rather at a preset time after dawn (the lowest parts of the sun path may be neglected—shadow duration is usually only regulated in the central part of the day, excluding twilight periods). Conversely, L2 is the line passing through the most easterly point of the ground contour of the future building, and whose orientation corresponds to the azimuth of the sun at sunset—or rather at a preset time before sunset. It is easy to understand that points of the protected regions to the east of L2 or to the west of L1 will never be in shadow. Moreover, an observer situated at a generic point P1 inside the portion of the protected region comprised between L1 and L2 will see the building B within a smaller solid angle than an observer situated on the boundary PRB, and more precisely at point P1 defined as the intersection of PRB with the line linking P1 with the center of the building. As a consequence, if the shadow duration constraint is satisfied on the relevant segment RSB, it will necessary be satisfied over the whole protected region. Actually, this is not true if the building has a big hole, e.g. is arc-shaped such as the "Grande Arche de la Défense" near Paris. This case, however, is quite rare and will be neglected.

The method proceeds as follows.

First of all, the user provides input data, including:
- the geographical situation of the prospective building, or at least its latitude;
- its ground contour GC—i.e. its projection onto the ground (which does not necessarily coincide with the contour of its base: a building can be slanted, or larger at its top than at its bottom);
- the contour PRB of the protected region PR;
- the maximum allowed duration of shadow within the protected region;
- possibly, the maximum height of the building (by default, it can be "infinite");
- possibly, the date at which the shadow duration is defined (by default, the winter solstice);
- possibly, the position of the projection on the ground of the top (the highest point) of the building—alternatively, as it will be discussed below, the algorithm may be executed for a plurality of tentative positions, sampling the footprint of the building).

An initial volume IV is computed by vertically extruding the ground contour GC of the building, up to the maximum height. The "vertical" direction is perpendicular to the ground.

The relevant segment RSB of the boundary PRB is then identified, as discussed above with reference to FIG. 5, with the initial volume IV playing the role of the building B. Said relevant segment is then sampled, yielding a plurality of discrete points. The greater the density of the sampling, the more accurate will be the result, but the longer the calculations.

For each one of the discrete points of the relevant segment of the boundary PRB, a "cutting surface" CS intersecting the initial volume IV is then computed. This is represented on FIG. 6, for the case of a point P1. The cutting surface CS is constituted by a conical surface COS, having point P1 (in general: the relevant point of segment RSB) as its vertex and the sun path SP as its base, and a dihedral angle DA. This dihedral angle is formed by two vertical planes, VP1 and VP2, whose intersection forms a vertical edge DAE passing through point P1. The planes are symmetrically disposed on either side of point TP, which is the projection on the ground of the top of the building. The conical surface COS is interrupted in correspondence to the dihedral angle DA. Very importantly, the amplitude of the dihedral angle is such that the sun travels through the gap in a time equal to said maximum allowed duration of shadow.

Figure 7A:
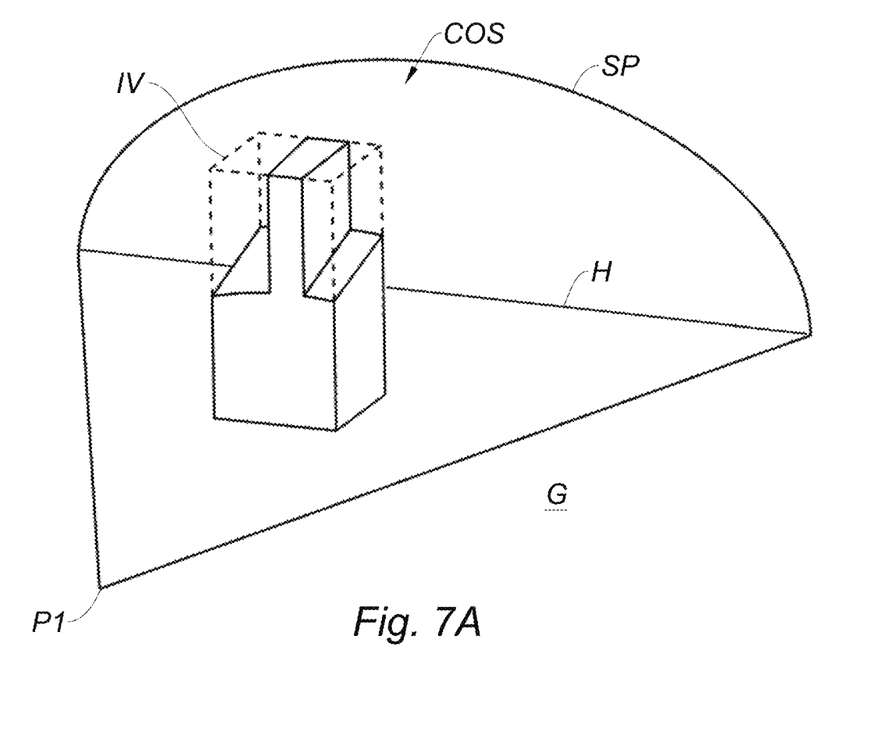
Figure 7B:
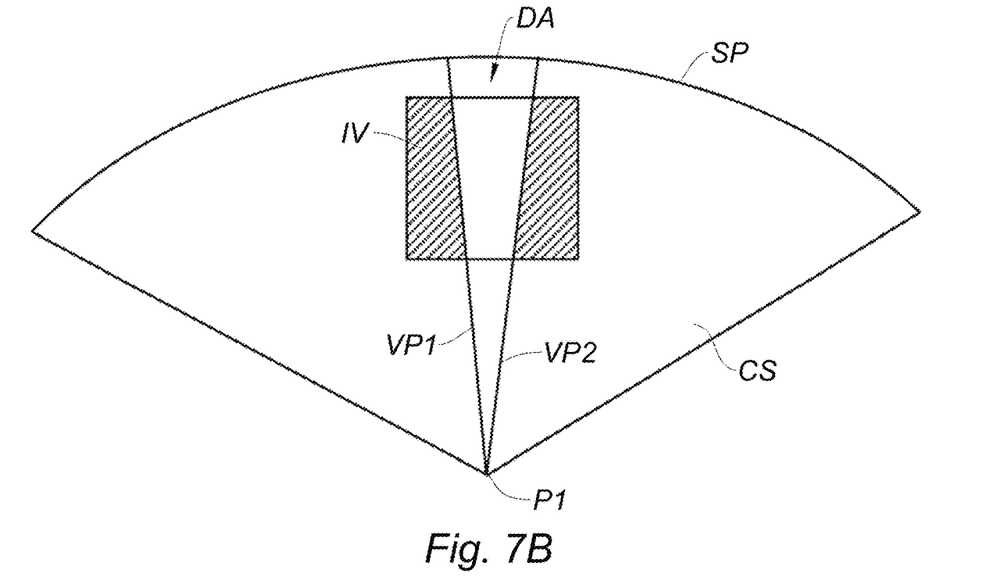

The "cutting surface" CS takes its name by the fact that the portion of the initial volume extending above it is cut away. As shown on FIGS. 7A (perspective) and 7B (view from above), the first "cut", performed by the cutting surface associated to point P1, leaves a modified volume having a sort of "tower" extending above a lower "roof". By construction, only the tower shadows point P1, and it does it for a duration which is precisely equal to the allowed maximum.

A similar "cutting" is performed for all the discrete points defined on the relevant segment RSB. This ensures that the shadow duration constraint is satisfied for all these points.

Figure 7C:
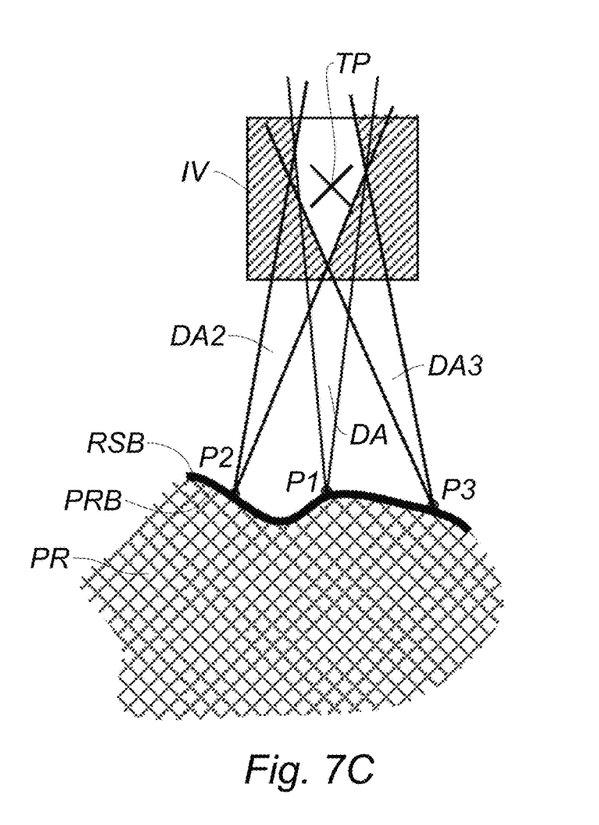

For instance, FIG. 7C shows three points P1, P2, P3 belonging to the relevant segment of the relevant segment RSB of the boundary PRB, and the dihedral angles DA, DA2, DA3 of the corresponding cutting surfaces, carving a diamond shaped tower from the initial volume IV.

The boundary surface of the remaining volume constitutes the building envelope having the greatest volume compatible with the shadow duration constraint and such that the projection of its (usually flat) top onto the ground contains the point TP.

Figure 8:
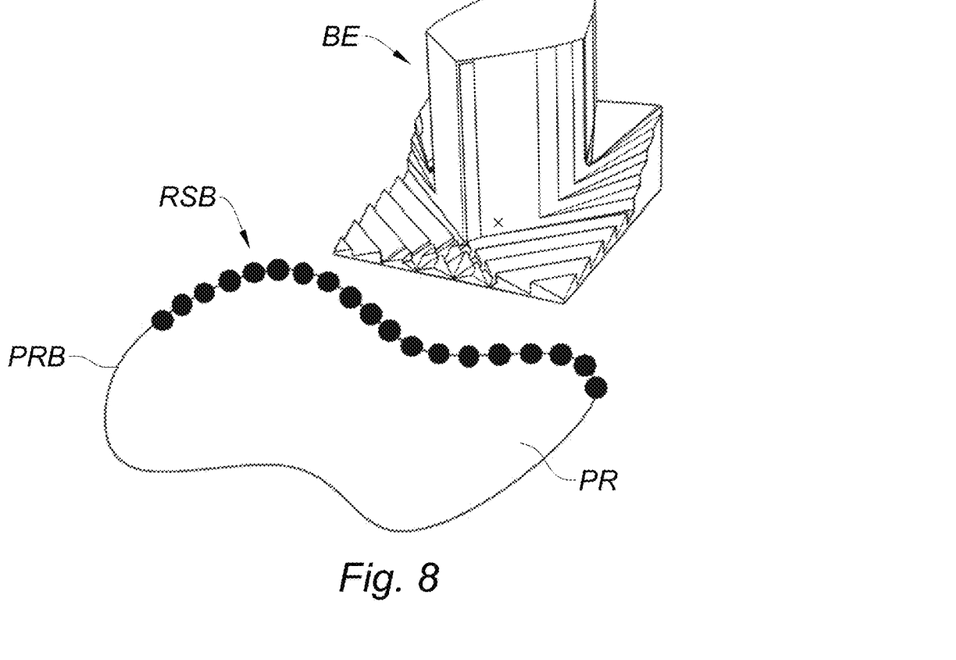
FIGS. 8 and 9 are exemplary building envelopes obtained by a method according to the invention.
Figure 9:
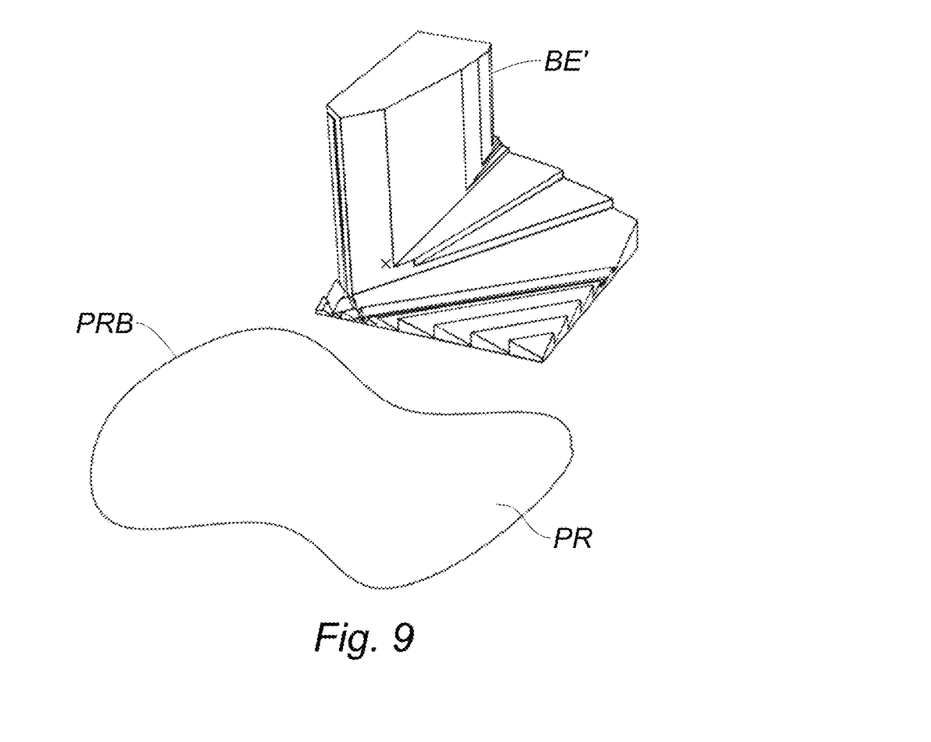

FIGS. 8 and 9 show two building envelopes, BE and BE', computed by a method according to the invention for different positions of the point TP. It can easily be seen that the position of TP greatly influences the shape of the envelope, and its internal volume. For this reason, it may be advantageous to consider a plurality of positions of TP, compute the respective envelope and keep the "best" one according to a suitable criterion, e.g. the one having the greatest volume.

Envelopes BE and BE' have a characteristic "stepped" shape, which is an artifact due to the discrete sampling of segment RSB (the sampling is represented on FIG. 8). This artifact can be suppressed by a smoothing operation, carried out using conventional techniques.

The inventive method has been described assuming that the protected zone PR is two-dimensional, and its boundary PR is a line. The generalization to the case of a three-dimensional "protected volume" delimited by a two-dimensional boundary is straightforward.

In a similar way, it has been assumed that the ground around the building is flat; otherwise stated, the shadow durations zone and the protected region are like drawn on a map. Taking into account land elevation, however, is straightforward—it only requires using a three-dimensional model of the ground instead of a planar representation of it.

Figure 10:
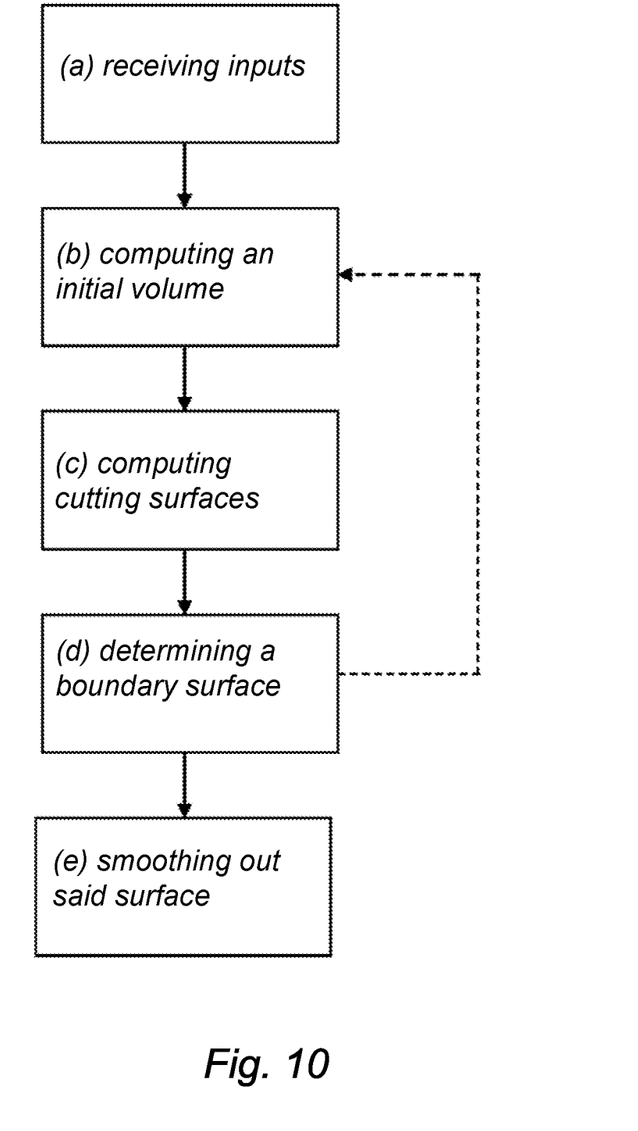
FIG. 10 is a flow-chart of a method according to an embodiment of the invention.

FIG. 10 is a flow-chart of the method described above in reference to FIGS. 5 to 7C.

Step a) corresponds to the inputting of the required items of information: the latitude at which the building will be situated, its ground contour GC, the boundary PRB of the neighboring region PR of the building over which the maximum allowed duration of shadow is defined, said maximum allowed duration, possibly a date (by default, the winter solstice), possibly the position of the projection on the ground TP of the top of the building.

Step b) corresponds to the computation of the initial volume IV.

Step c) corresponds to the computation of the cutting surface CS, and to the "trimming" of the initial volume IV by said cutting surfaces.

At step d), the building envelope BE is determined as the boundary surface of the trimmed volume.

Optional step e) consists in smoothing out the envelope.

Steps b) to d), or b) to e), may optionally be iterated for a plurality of positions of the point TP. For instance, this allows choosing the position which maximizes the volume contained within the envelope BE.

The architect will then be free to design the building inside the (possibly smoothed) envelope.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 11:
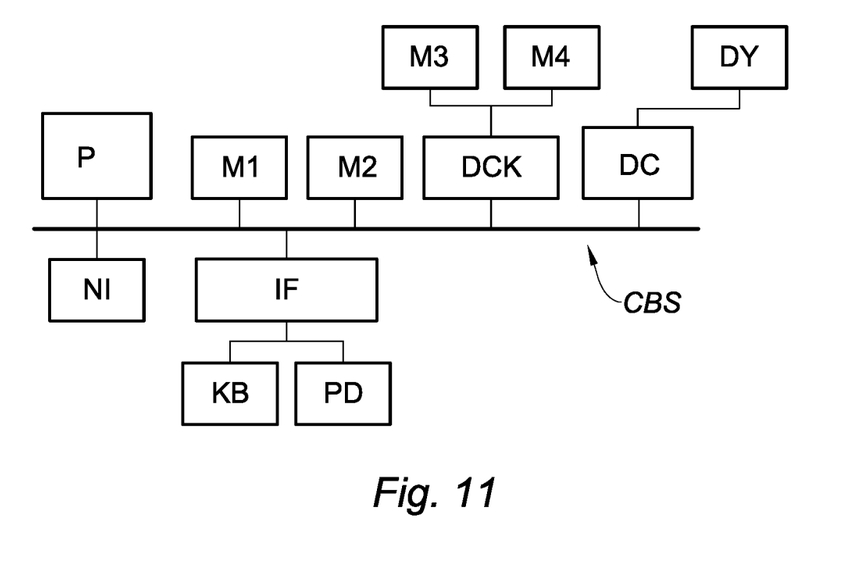
FIGS. 11 and 12 are block diagrams of respective computer systems suitable for carrying out a method according to an embodiment of the invention.

A computer—more precisely a Computer Aided Design station—suitable for carrying out a method according to an exemplary embodiment of the present invention is described with reference to FIG. 11. In FIG. 11, the computer includes a Central Processing Unit (CPU) P which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. Topographical maps and/or three-dimensional models of the ground on which the building is to be constructed are also stored on one or more of memory devices M1 to M4, or remotely.

The claimed invention is not limited by the form of the computer-readable media on which the computer-readable instructions and/or maps/models of the ground are stored. For example, the instructions and maps/models can be stored on CDs, DVDs, in FLASH memory, RAM, ROM, PROM, EPROM, EEPROM, hard disk or any other information processing device with which the computer aided design station communicates, such as a server or computer. The program and the maps/models can be stored on a same memory device or on different memory devices.

Further, a computer program suitable for carrying out the inventive method can be provided as a utility application, background daemon, or component of an operating system, or combination thereof, executing in conjunction with CPU P and an operating system such as Microsoft VISTA, Microsoft Windows 7, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 11 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface.

Disk controller DKC connects HDD M3 and DVD/CD M4 with communication bus CBS, which can be an ISA, EISA, VESA, PCI, or similar, for interconnecting all of the components of the computer aided design station.

A description of the general features and functionality of the display, keyboard, pointing device, as well as the display controller, disk controller, network interface and I/O interface is omitted herein for brevity as these features are known.

Figure 12:
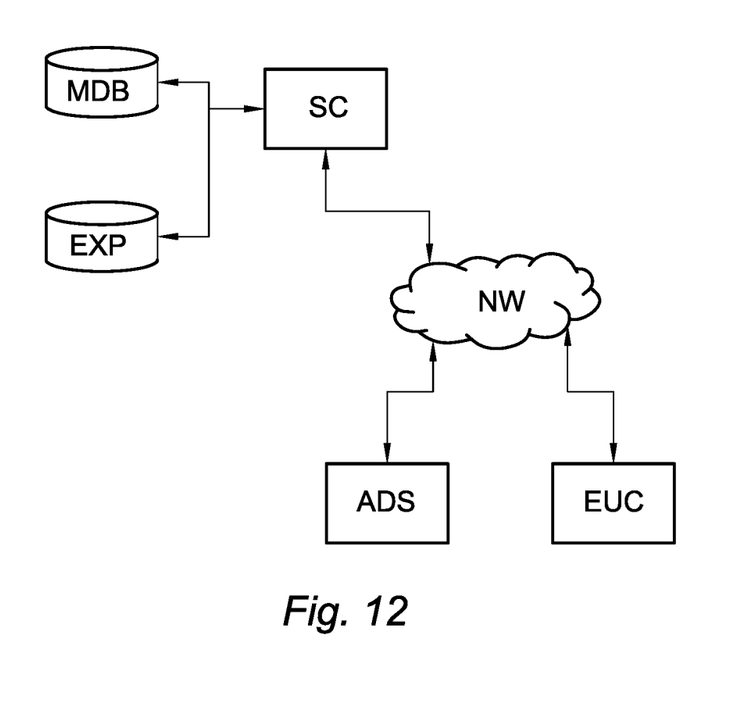

FIG. 12 is a block diagram of a computer system suitable for carrying out a method according to a different exemplary embodiment of the present invention.

In FIG. 12, the executable program EXP, together with topographical maps of three-dimensional models of the ground, are stored on memory devices connected to a server SC. The memory devices and the overall architecture of the server may be the same as discussed above with reference to FIG. 11, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 11, except that the memory devices of the administrator system and the end user computer do not store the executable program EXP and/or the maps/models of the ground. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses, via the network NW, a database MDB stored by the server SC and containing maps or models of the ground on which the user can define the ground contour of the building and the boundary of the neighboring region over which the maximum allowed duration of shadow is imposed.

Although only one administrator system ADS and one end user computer EUC are shown, the system can support any number of administrator systems and/or end user systems without limitation. Similarly, multiple servers, maps/models database can also be implemented in the system without departing from the scope of the present invention Any processes described herein should be understood as representing modules, segments, or portions of code which include one or more executable instructions for implementing specific logical functions or steps in the process, and alternate implementations are included within the scope of the exemplary embodiment of the present invention.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for computing an envelope (BE) for a building to be designed inside said envelope, the method comprising:
   a) defining an initial volume (IV) of the building; and
   b) for each one a plurality of points (P1, P2, P3) of a boundary (PRB) of a neighboring ground region (PR) of the building, computing a cutting surface (CS) and modifying the initial volume by cutting out portions thereof extending above said cutting surface;
   wherein each cutting surface is defined in such a way that the initial volume, modified by cutting out portions thereof extending above said cutting surface, projects over a corresponding point of a boundary of a shadow (SW) whose duration is equal to a predetermined value;
   said envelope being defined by a boundary surface of a remaining volume.

2. The method of claim 1 further comprising the steps of:
   a1) receiving as inputs:
   a latitude of the building,
   a ground contour (GC) of the building,
   a boundary (PRB) of a neighboring region (PR) of the building, and
   a maximum allowed duration of shadow (SW) of the neighboring region from the building;
   b1) computing an initial volume (IV) by vertically extruding the ground contour of the building;
   c1) for each one (P1) of a plurality of points (P1, P2, P3) of a portion (RSB) of the boundary of the neighboring region facing the ground contour of the building, computing a cutting surface (CS) defined by:
   two vertical planes (VP1, VP2) forming a dihedral angle (DA) having a vertical edge (DAE) passing through said point, the planes being symmetrically disposed on either side of a predetermined ground point (TP) constituting a projection on ground of a highest point of the building; and
   a conical surface (COS), having the point (P1) as its vertex and a sun path (SP) at the latitude of the building on a predetermined date as its base, said conical surface being interrupted by a gap formed by said dihedral angle;
   the dihedral angle having an amplitude such that the sun (S) travels through the gap in a time equal to said maximum allowed duration of shadow;
   and cutting out portions of the initial volume extending above said cutting surface; and
   d1) determining a boundary surface of a volume remaining after said cutting out, said boundary surface constituting an envelope (BE) of the building to be designed.

3. The method of claim 2, wherein said predetermined date is a winter solstice.

4. The method of claim 2, wherein step a1) further comprises receiving as an input said predetermined date.

5. The method of claim 2 wherein step a1) further comprises receiving as an input a position of said predetermined point (TP), constituting a projection of the ground of a highest point of the building.

6. The method of claim 2 wherein steps b1), c1) and d1) are iterated a plurality of times for different positions of said predetermined point constituting a projection of the ground of a highest point of the building, yielding a corresponding plurality of envelopes of the building to be designed; and
   the method further comprising a step of choosing an envelope defining a largest volume.

7. The method of claim 2, further comprising a step e1) of smoothing out said surface constituting an envelope of the building to be designed.

8. The method of claim 1, wherein said boundary of the neighboring ground region is a contour line delimitating a planar representation of the neighboring ground region.

9. A computer program product, comprising:
   a non-transitory computer-readable data-storage medium (M1-M4), carrying computer-executable instructions to cause a computer system to compute an envelope of a building to be designed;
   the computer-executable instructions including instructions to:
   a) define an initial volume (IV) of the building; and
   b) for each one a plurality of points (P1, P2, P3) of a boundary (PRB) of a neighboring ground region (PR) of the building, compute a cutting surface (CS) and modify the initial volume by cutting out portions thereof extending above said cutting surface;
   wherein each cutting surface is defined in such a way that the initial volume, modified by cutting out portions thereof extending above said cutting surface, projects over a corresponding point of a boundary of a shadow (SW) whose duration is equal to a predetermined value;
   said envelope being defined by a boundary surface of a remaining volume.

10. The computer program product of claim 9 wherein the computer-executable instructions further include instructions to:
    a1) receive as inputs:
    a latitude of the building,
    a ground contour (GC) of the building,
    a boundary (PRB) of a neighboring region (PR) of the building, and
    a maximum allowed duration of shadow (SW) of the neighboring region from the building;
    b1) compute an initial volume (IV) by vertically extruding the ground contour of the building;
    c1) for each one (P1) of a plurality of points (P1, P2, P3) of a portion (RSB) of the boundary of the neighboring region facing the ground contour of the building, compute a cutting surface (CS) defined by:
    two vertical planes (VP1, VP2) forming a dihedral angle (DA) having a vertical edge (DAE) passing through said point, the planes being symmetrically disposed on either side of a predetermined ground point (TP) constituting a projection on ground of a highest point of the building; and
    a conical surface (COS), having the point (P1) as its vertex and a sun path (SP) at the latitude of the building on a predetermined date as its base, said conical surface being interrupted by a gap formed by said dihedral angle;
    the dihedral angle having an amplitude such that the sun (S) travels through the gap in a time equal to said maximum allowed duration of shadow;
    and cutting out portions of the initial volume extending above said cutting surface; and
    d1) determine a boundary surface of a volume remaining after said cutting out, said boundary surface constituting an envelope (BE) of the building to be designed.

11. The computer program product as claimed in claim 10 wherein the instructions to b1), c1) and d1) are iterated a plurality of times for different positions of said predetermined point constituting a projection of the ground of a highest point of the building, yielding a corresponding plurality of envelopes of the building to be designed, the computer-executable instructions further comprise choosing an envelope defining a largest volume.

12. The computer program product as claimed in claim 9 wherein said boundary of the neighboring ground region is a contour line delimitating a planar representation of the neighboring ground region.

13. A computer system comprising:
    a processor (P) coupled to a memory (M1-M4), and a graphical user interface (KB, PD, DC, DY),
    the memory storing computer-executable instructions (EXP) to cause the computer system to compute an envelope of a building to be designed inside said envelope, the computing being by:

a) defining an initial volume (IV) of the building; and
b) for each one a plurality of points (P1, P2, P3) of a boundary (PRB) of a neighboring ground region (PR) of the building, computing a cutting surface (CS) and
modifying the initial volume by cutting out portions thereof extending above said cutting surface;
wherein each cutting surface is defined in such a way that the initial volume, modified by cutting out portions thereof extending above said cutting surface, projects over a corresponding point of a boundary of a shadow (SW) whose duration is equal to a predetermined value;
said envelope being defined by a boundary surface of a remaining volume.

14. The computer system of claim 13 wherein the stored computer-executable instructions further cause the computer system to compute by:
a1) receiving as inputs:
a latitude of the building,
a ground contour (GC) of the building,
a boundary (PRB) of a neighboring region (PR) of the building, and
a maximum allowed duration of shadow (SW) of the neighboring region from the building;
b1) computing an initial volume (IV) by vertically extruding the ground contour of the building;
c1) for each one (P1) of a plurality of points (P1, P2, P3) of a portion (RSB) of the boundary of the neighboring region facing the ground contour of the building, computing a cutting surface (CS) defined by:
two vertical planes (VP1, VP2) forming a dihedral angle (DA) having a vertical edge (DAE) passing through said point, the planes being symmetrically disposed on either side of a predetermined ground point (TP) constituting a projection on ground of a highest point of the building; and
a conical surface (COS), having the point (P1) as its vertex and a sun path (SP) at the latitude of the building on a predetermined date as its base, said conical surface being interrupted by a gap formed by said dihedral angle;
the dihedral angle having an amplitude such that the sun (S) travels through the gap in a time equal to said maximum allowed duration of shadow;
and cutting out portions of the initial volume extending above said cutting surface; and
d1) determining a boundary surface of a volume remaining after said cutting out, said boundary surface constituting an envelope (BE) of the building to be designed.

15. The computer system of claim 14 wherein said predetermined date is a winter solstice.

16. The computer system of claim 14 wherein step a1) further comprises receiving as an input said predetermined date.

17. The computer system of claim 14 wherein step a1) further comprises receiving as an input a position of said predetermined point (TP), constituting a projection of the ground of a highest point of the building.

18. The computer system of claim 14 wherein steps b1), c1) and d1) are iterated a plurality of times for different positions of said predetermined point constituting a projection of the ground of a highest point of the building, yielding a corresponding plurality of envelopes of the building to be designed, the stored computer-executable instructions further cause the computer system to choose a envelope defining a largest volume.

19. The computer system of claim 14 further comprising a step e1) of smoothing out said surface constituting an envelope of the building to be designed.

20. The computer system of claim 13 wherein said boundary of the neighboring ground region is a contour line delimitating a planar representation of the neighboring ground region.

* * * * *

UNITED STATES PATENT AND TRADEMARK OFFICE
CERTIFICATE OF CORRECTION

| | | |
|---|---|---|
| PATENT NO. | : 11,681,836 B2 | Page 1 of 1 |
| APPLICATION NO. | : 16/050484 | |
| DATED | : June 20, 2023 | |
| INVENTOR(S) | : Bertrand Faure | |

It is certified that error appears in the above-identified patent and that said Letters Patent is hereby corrected as shown below:

In the Claims

In Column 9, Claim 9, Line 62, after "designed" insert --inside said envelope--.

Signed and Sealed this
Eighth Day of August, 2023

Katherine Kelly Vidal
*Director of the United States Patent and Trademark Office*